United States Patent
Mannby

(10) Patent No.: US 10,664,658 B2
(45) Date of Patent: May 26, 2020

(54) ABBREVIATED HANDWRITTEN ENTRY TRANSLATION

(71) Applicant: Microsoft Technology Licensing, LLC, Redmond, WA (US)

(72) Inventor: Claes-Fredrik U. Mannby, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/110,820

(22) Filed: Aug. 23, 2018

(65) Prior Publication Data
US 2020/0065370 A1 Feb. 27, 2020

(51) Int. Cl.
*G06F 17/20* (2006.01)
*G06F 40/274* (2020.01)
*G06F 40/205* (2020.01)
*G06F 3/0488* (2013.01)

(52) U.S. Cl.
CPC .......... *G06F 40/274* (2020.01); *G06F 40/205* (2020.01); *G06F 3/04883* (2013.01)

(58) Field of Classification Search
CPC .......................... G06F 17/276; G06F 3/04883
See application file for complete search history.

(56) References Cited

U.S. PATENT DOCUMENTS

| | | | |
|---|---|---|---|
| 5,161,105 A | 11/1992 | Kugimiya et al. | |
| 6,279,018 B1 | 8/2001 | Kudrolli et al. | |
| 7,167,825 B1 | 1/2007 | Potter | |
| 7,475,343 B1 | 1/2009 | Mielenhausen | |

(Continued)

FOREIGN PATENT DOCUMENTS

WO 2010112841 A1 10/2010

OTHER PUBLICATIONS

"International Search Report and Written Opinion Issued in PCT Patent Application No. PCT/US2019/030980", dated Jul. 2, 2019, 10 Pages.

(Continued)

*Primary Examiner* — Keith D Bloomquist
(74) *Attorney, Agent, or Firm* — Fiala & Weaver P.L.LC.

(57) ABSTRACT

Methods, mobile electronic devices, and computer program products are provided for accepting abbreviated handwritten entry of phrases, sentences or paragraphs, and supplemental information ("hints"), and probabilistically determining the most likely translation of the abbreviated handwriting to a full text counterpart, and displaying same. Abbreviated handwriting is accepted and parsed according to a predefined reduction pattern to produce multi-character handwritten segments and corresponding segment hints. The multi-character handwritten segments and corresponding segment hints are evaluated using n-gram knowledge and/or language models to identify the most likely words corresponding to the multi-character handwritten segments. The most likely words are used to evaluate the abbreviated handwritten entry at the phrase level by evaluating the likelihood of transition from one word to the next amongst the most likely words, to compute phrase probabilities for various combinations of the most likely words. The most likely phrase(s) are output based in part on the phrase probabilities.

20 Claims, 6 Drawing Sheets

(56) References Cited

U.S. PATENT DOCUMENTS

| | | |
|---|---|---|
| 2005/0267757 A1 | 12/2005 | Iso-Sipila et al. |
| 2007/0076862 A1 | 4/2007 | Chatterjee et al. |
| 2007/0089070 A1* | 4/2007 | Jaczyk ............... G06F 3/04883 715/816 |
| 2007/0260602 A1 | 11/2007 | Taylor |
| 2008/0294982 A1 | 11/2008 | Leung et al. |
| 2011/0107206 A1 | 5/2011 | Walsh et al. |
| 2011/0184738 A1 | 7/2011 | Kalisky et al. |
| 2012/0259615 A1 | 10/2012 | Morin et al. |
| 2014/0039871 A1 | 2/2014 | Crawford |
| 2016/0071511 A1 | 3/2016 | Park et al. |
| 2016/0252972 A1* | 9/2016 | Kim ...................... G10L 15/183 704/9 |
| 2016/0371250 A1 | 12/2016 | Rhodes |
| 2017/0163339 A1 | 6/2017 | Cornelius et al. |
| 2017/0169339 A1 | 6/2017 | Dalmia et al. |
| 2017/0357633 A1 | 12/2017 | Wang et al. |
| 2018/0067912 A1 | 3/2018 | Deluca et al. |
| 2018/0089332 A1 | 3/2018 | Deluca et al. |
| 2019/0034406 A1* | 1/2019 | Singh .................... G06F 3/0481 |
| 2019/0114478 A1 | 4/2019 | Xi et al. |
| 2019/0155916 A1 | 5/2019 | Huang et al. |
| 2019/0361975 A1 | 11/2019 | Mannby |
| 2019/0392034 A1 | 12/2019 | Medlock et al. |

OTHER PUBLICATIONS

"Non-Final Office Action Issued in U.S. Appl. No. 15/986,473", dated Aug. 9, 2019, 12 Pages.

Nandi, et al., "Effective Phrase Prediction", In Proceedings of the 33rd International Conference on Very Large Data Bases, Sep. 23, 2007, pp. 219-230.

"Final Office Action Issued in U.S. Appl. No. 15/986,473", dated Jan. 15, 2020, 8 Pages.

"Notice of Allowance Issued in U.S. Appl. No. 15/986,473", dated Mar. 13, 2020, 6 Pages.

* cited by examiner

500

| Provide on the user interface of the electronic device a single phrase of the plurality of phrases having a highest probability among the set of phrase probabilities | 502 |

| Provide on the user interface of the electronic device a predetermined number of the plurality of phrases corresponding to the phrases having the highest probabilities among the set of phrase probabilities | 602 |

Map a handwritten first portion of the handwritten input to the multi-character handwritten element — 802

Map second portion of the handwritten input to the segment hint — 804

ABBREVIATED HANDWRITTEN ENTRY TRANSLATION

BACKGROUND

Predictive auto-complete text entry is a function implemented in some text handling tools to automatically complete the text of a word after only a limited amount of text entry, as little as 1 to 3 keystrokes in some cases. Predictive auto-complete text entry tools save the user time by having the user enter fewer keystrokes in order to enter a full word. Such tools are particularly valuable on mobile devices that are used to send text messages (e.g., Short Message Service (SMS) messages, etc.), electronic mail, or other text intensive applications, particularly considering the relatively small keyboard featured on mobile devices. Predictive auto-complete text entry may also be referred to as "word completion." Predictive auto-complete text entry improves efficiency of text entry (i.e. improves speed and reduces errors) by reducing the number of characters that must be entered.

Manual handwritten text entry on a digital surface is another method for inputting text to applications. Handwritten text entry is the process of accepting digitized writing made by the user (typically with a stylus or finger on a touch sensitive screen) and performing handwriting recognition on the digitized writing (sometimes called "digital ink") to determine the text characters that were input. Handwritten text entry may be desired under certain circumstances. For example, rather than "hunt and peck" on the small keyboard of a mobile device, a user may find it easier to write on a touch screen with a stylus, using a greater area of the touch screen to do so. Likewise, some users may have aesthetic or nostalgic attachments to handwriting versus typing. Handwritten text entry can, however, be a tiring and error prone process. Even people who prefer to write by hand may not do so with regularity, while others may not have engaged in significant handwriting in a long time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, apparatuses, and computer program products are provided that enable abbreviated handwritten entries to be translated to their intended words, enabling such translation to be performed at any level, including the levels of word, phrase, sentence, or paragraph. In aspects, abbreviated handwritten words that may correspond to a full word, phrase, sentence, paragraph, etc., is input by the user at a touch sensitive surface (e.g. a touch screen). While inputting one or more abbreviated handwritten words, the user also inputs supplemental information ("hints"). One or more words, phrases, sentences, etc., are generated based on the abbreviated handwritten words and the hints and may be displayed according to the probability that the abbreviated handwritten words correspond to them.

In one implementation, a text phrase predictor is enabled to accept handwritten abbreviated text ("reduced text") and corresponding hints, parse the reduced text and corresponding hints according to a predefined pattern to generate a sequence of parsed text elements, with each parsed text element including one or more characters in a handwritten segment (referred to as a "multi-character handwritten segment" when multiple characters are present) and a corresponding segment hint. The text phrase predictor is further enabled to determine one or more full text phrases, the words of which are most likely to correspond to the parsed text elements, and to display the one or more full text phrases on a display screen of a computing device. In one example, each of the sequence of parsed text elements and its corresponding segment hint is analyzed to determine a set of word probabilities, each of the probabilities being the probability that the particular parsed text element corresponds to a particular word. Further, the sets of word probabilities are analyzed to determine a plurality of phrase probabilities, each of the phrase probabilities being the probability that the sequence of parsed text elements corresponds to a particular full text phrase, sentence or paragraph.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 5 shows a process for providing, on a user interface, a phrase having the highest probability of corresponding to an abbreviated handwritten input, according to an example embodiment.

FIG. 6 shows a process for providing on a user interface, a plurality of phrases having the highest respective probabilities of corresponding to an abbreviated handwritten input, according to an embodiment

Figure 1:
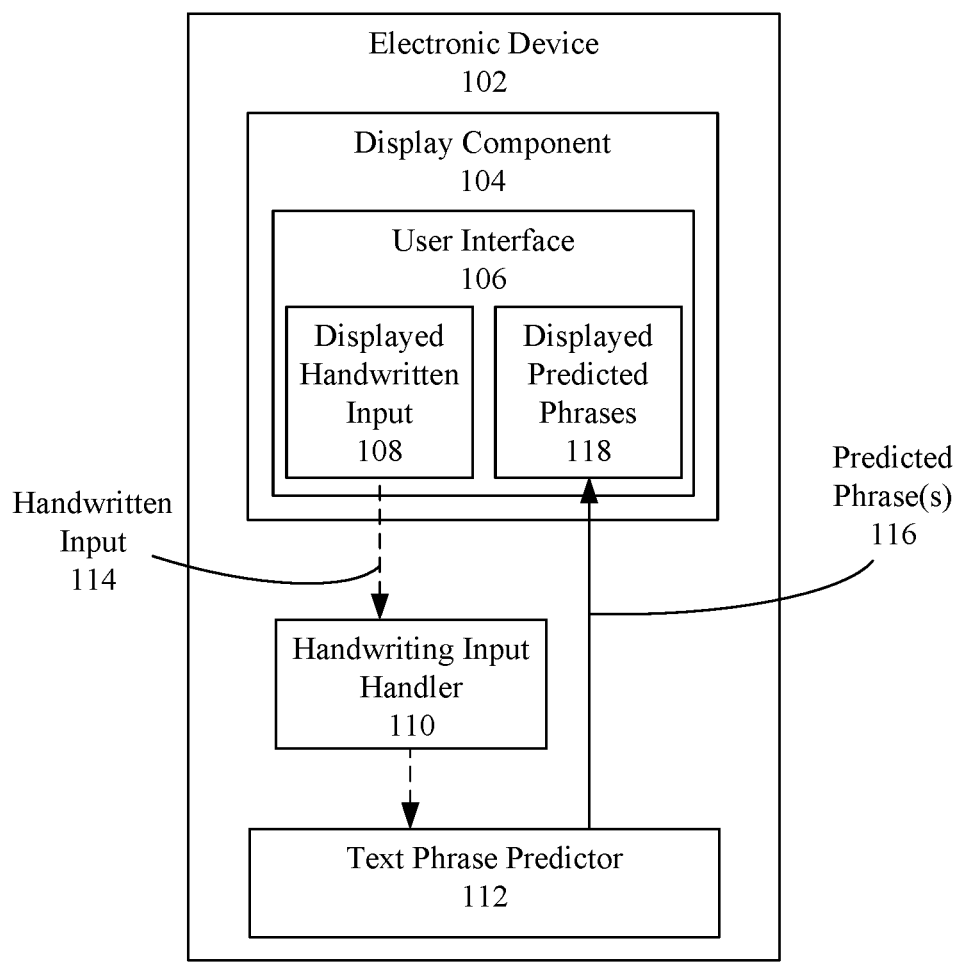
FIG. 1 shows a block diagram of a mobile electronic device that is equipped to receive and process abbreviated handwritten input including hints, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Handwriting recognition algorithms may be applied to handwritten text entry to re-write the corresponding letters in plain text. In the field of text entry, predictive auto-complete may be implemented in some text handling tools to automatically complete the text of a word after only a limited amount of text entry, as little as 1 to 3 keystrokes in some cases. Predictive auto-complete text entry tools save the user time by having the user enter fewer keystrokes in order to enter a full word. Such tools are particularly valuable on mobile devices that are used to send text messages (e.g., Short Message Service (SMS) messages, etc.), electronic mail, or other text intensive applications, particularly considering the relatively small keyboard featured on mobile devices.

Predictive auto-complete text entry improves efficiency of text entry (i.e. improves speed and reduces errors) by reducing the number of characters that must be written or entered. However, current auto-complete text entry tools are configured to operate only at the word level. That is, text entry is used to predictively auto-complete a single word. By potentially correcting every written or entered word rather than correcting at the phrase level, users are forced to slow their overall handwriting or text entry rate and interrupt their own train of thought to look at whether the predictive auto-completely text entry correctly auto-completed the last word. Furthermore, current auto-complete text entry tools have no user-provided input to work with in making their determinations other than the explicitly entered characters.

Embodiments described herein enable electronic devices, including touchscreen mobile devices such as smart phones or tablets, to accept handwritten reduced text and corresponding hints according to a predefined reduction pattern, to determine the probabilities that the handwritten reduced text corresponds to one or more words, or to one or more full text phrases, which may include phrases, sentences, and/or paragraphs, and to display the one or more words and/or full text phrases on a display component of an electronic device according to such probabilities. Determining such probabilities may be accomplished in various ways, according to embodiments disclosed herein.

Hereinafter, when the described embodiments refer to "handwritten abbreviated sentence-level text entry," "handwritten abbreviated sentence-level text," or the like, it should be understood that embodiments are not limited to sentences, but that these terms encompass individual phrases, sentences, and paragraphs. The terms "handwritten abbreviated text," "abbreviated text," and "reduced text" encompass individual words, phrases, sentences, and paragraphs.

In embodiments, such handwritten abbreviated text entry and translation may be implemented in a device in various ways. For instance, FIG. 1 shows a block diagram of a mobile electronic device that is equipped to accept and process abbreviated handwritten input including hints, according to an example embodiment. As shown in FIG. 1, mobile electronic device 102 includes a display component 104, a handwriting input handler 110, and a text phrase predictor 112. Display component 104 includes a display screen that displays a user interface 106. Mobile electronic device 102 and its features are described as follows.

Mobile electronic device 102 may be any type of mobile computer or computing device such as a handheld device (e.g., a Palm® device, a RIM Blackberry® device, a personal digital assistant (PDA)), a laptop computer, a notebook computer, a tablet computer (e.g., an Apple iPad™, a Microsoft Surface™, etc.), a netbook, a mobile phone (e.g., a smart phone such as an Apple iPhone, a Google Android™ phone, a Microsoft Windows® phone, etc.), a wearable device (e.g., virtual reality glasses, helmets, and visors, a wristwatch (e.g., an Apple Watch®)), and other types of mobile devices. Furthermore, although mobile electronic device 102 is indicated as a mobile device, embodiments may be implemented in stationary devices as well, including a personal computer.

Display component 104 is a display of mobile electronic device 102 that is used to display text (textual characters, including alphanumeric characters, arithmetic symbols, etc.), and optionally graphics, to users of mobile electronic device 102. For instance, display component 104 may include a display screen that is a portion of or an entirety of a surface of mobile electronic device 102. In an embodiment, the display screen of display component 104 is touch sensitive and configured to accept handwritten input on its surface. Display component 104 may be an LED (light emitting diode)-type display, an OLED (organic light emitting diode)-type display, an LCD (liquid crystal display)-type display, a plasma display, or other type of display that may or may not be backlit.

In embodiments, display component 104 may include a display screen that is a touch sensitive display or touchscreen, and that may display any number of virtual interface elements (e.g., such as a virtual keyboard or other user interface element displayed in user interface 106 by display component 104), and/or other user interface elements described elsewhere herein or otherwise known. In embodiments, user interface 106 as displayed by display component 104, and receives and may display the user's handwriting as displayed handwritten input 108. For example, displayed handwritten input 108 may displayed in the form of screen pixels illuminated in any color and intensity (or un-illuminated in the case of black) where a user contacted the display screen of display component 104 with a pen, stylus, finger, etc., to write handwriting. Display component 104 is configured to output displayed handwritten input 108 in the form of data (e.g., pixel values, rasterized data, etc.) as handwritten input 114, which is received by handwriting input handler 110.

In other embodiments, however, handwriting input handler 110 may be configured to accept handwritten input 114 from devices external to the device (not shown) such as a touchpad, trackpad, graphics pad, graphics tablet, digitizer, drawing tablet, drawing pad, pen tablet, digital art board, or other types of similar input devices capable of capturing handwriting for processing by mobile electronic device 102 as may be known in the art. In another embodiment, handwritten input 114 may be provided to handwriting input handler 110 in the form of one or more images of physically written handwriting. Such images may comprise image files generated by a digital camera (e.g. JPG, DNG, TIFF, PSD or RAW image files), or may comprise files generated from scanning a document containing physically written handwriting (e.g. JPG, TIFF or PDF files). In such embodiments, handwriting input handler 110 may store handwritten input 114 (e.g., in memory or other storage), and forward handwritten input 114 to display component 104 for display (not shown). Handwriting input handler 110 may provide handwritten input 114 to display component 104 in any form (e.g., as character data, display pixel data, rasterized graphics, etc.).

In an embodiment, handwritten input 114 comprises the digitized form of the handwriting sensed by the touch sensitive sensors of display component 104 (or suitable external devices as described above) which itself may comprise handwritten letters, numbers, shapes or any type of drawing. In embodiments, the type of digital information in handwritten input 114 is sometimes referred to as "digital ink." In another embodiment, handwritten input 114 may comprise not only the "digital ink," but may also include other types of input such as one or more keypresses, button presses, or screen taps captured contemporaneously with the sensed handwriting. In embodiments, and as described in further detail below, such additional captured input may provide useful information about the contemporaneously captured handwritten text. Regardless of the source of handwritten input 114, handwriting input handler 110 is configured to provide handwritten input 114 to text phrase predictor 112 for processing and translation according to one or more embodiments, and as described in further detail below.

In an embodiment, and as noted above, text phrase predictor 112 may receive handwritten input 114 from handwriting input handler 110. In embodiments, text phrase predictor 112 may be included in handwriting input handler 110, or may be separate from handwriting input handler 110, but still included in mobile electronic device 102 (as shown in FIG. 1). In another embodiment, text phrase predictor 112 may be separate from mobile electronic device 102 and accessible by mobile electronic device 102 over a network, such as a personal area network (PAN), a local area network (LAN), a wide area network (WAN), or a combination of networks such the Internet. For instance, text phrase predictor 112 may be accessible by mobile electronic device 102 over a network at a server, such as in a web service, a cloud service, etc.

In an embodiment, and as described in greater detail below, text phrase predictor 112 may be configured to automatically parse handwritten input 114, and probabilistically determine one or more phrases/sentences/paragraphs likely to correspond to handwritten input 114. For instance, in an embodiment, text phrase predictor 112 may automatically parse handwritten input 114 into a sequence of parsed elements and corresponding hints, and determine word probabilities that each of the elements corresponds to any of a plurality of words.

In an embodiment, text phrase predictor 112 may, based in part on the above-described word probabilities, further determine phrase probabilities wherein each phrase probability is the probability that the reduced text of handwritten input 114 corresponds to a particular sequence of words (i.e. phrase, sentence or paragraph). Upon determining the phrase probabilities, text phrase predictor 112 may provide one or more of the corresponding predicted phrases 116 to display component 104 for display in user interface 106 as displayed predicted phrases 118, in an embodiment.

As shown in FIG. 1, text phrase predictor 112 generates predicted phrase(s) 116, which is a full text version of the reduced text of handwritten input 114 that was received from the user via handwriting input handler 110. In an embodiment, the user may enter handwritten reduced text according to a predefined reduction pattern. For example, the user may handwrite the first two letters of each word in the sentence, phrase or paragraph they intend to enter. In the case of a single letter word, just that single letter may be entered. For instance, the user may write "mahaalila" Based thereon, text phrase predictor 112 may determine "mary had a little lamb" as predicted phrase 116. In addition to the first two letters of each word, the user also provides a hint immediately following the two letters, wherein the hint indicates a particular property of the word corresponding to the letters input immediately prior to the hint. In an embodiment, the hint may be handwritten and comprise a horizontal line, squiggle or some other handwritten stroke of a certain length, wherein the length of the stroke may be interpreted by text phrase predictor 112 as an indication of the length of the corresponding word. In another embodiment, a meaning may be attached to the direction of the handwritten stroke that comprises the hint. For example, a line, squiggle or some other stroke made in a diagonal fashion from lower left to upper right could provide a hint about word complexity or rarity. In another embodiment, the user may handwrite letters with the right hand, and may slide the left thumb up or down on the screen after writing the reduced text letters for a given word, with the length of the slide indicating word length.

In another embodiment, instead of handwritten hint input, the hint may be input in some other manner immediately before, during or after the handwritten text input. For example, predetermined portions of the touch sensitive surface may be reserved for touch input having pre-defined meanings such as those described above. A screen tap of such a region made contemporaneously with the handwritten entry of the letters may then comprise handwritten input 114, and be interpreted thereafter in the manner described herein.

Figure 2:
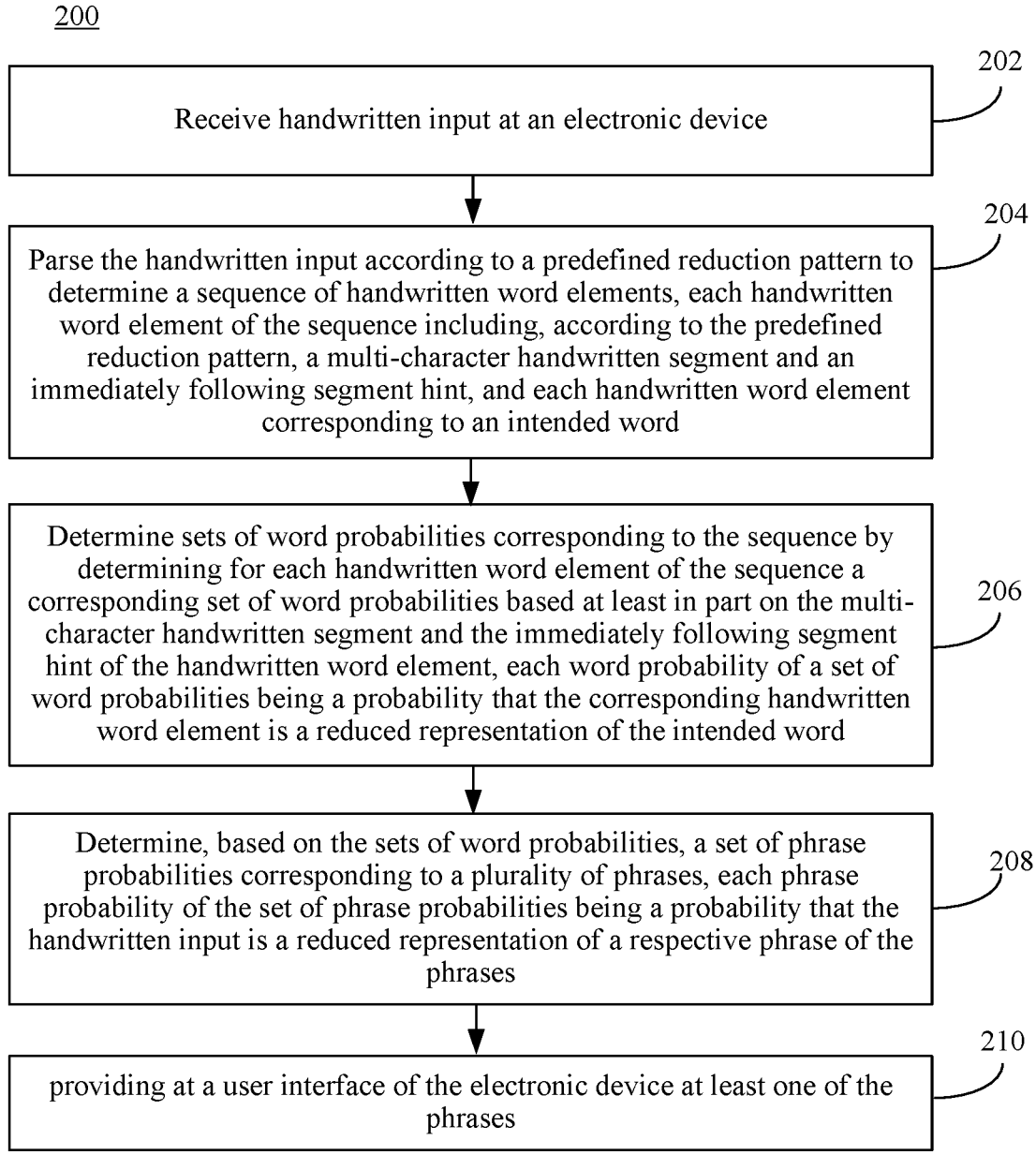
FIG. 2 shows a flowchart of a method for receiving and processing handwritten input to produce and display a phrase based on the probability the phrase corresponds to the abbreviated handwritten input, according to an example embodiment.

In embodiments, text phrase predictor 112 of mobile electronic device 102 may translate reduced handwritten input to words, phrases, paragraphs, etc., in various ways. For instance, FIG. 2 shows a flowchart 200 of an example method for probabilistically generating and displaying a full text phrase from a handwritten reduced text entry including hints, according to an example embodiment. In an embodiment, flowchart 200 may be performed by text phrase predictor 112 of mobile electronic device 102. Note, however, that in other embodiments, one or more steps of flowchart 200 may be performed by other modules or components of electronic mobile device 102. For instance, any operations described hereinafter as being performed by text phrase predictor 112 may be integrated into one or more other modules such as, for example, handwriting input handler 110. Still further, not all steps of flowchart 200 need be performed in all embodiments. Other structural and operational embodiments will be apparent to persons skilled in the relevant art(s) based on the following discussion regarding flowchart 200.

Flowchart 200 begins at step 202. In step 202 of flowchart 200, handwritten input is received from the user at an electronic device. For example, as shown in FIG. 1, handwriting input handler 110 of mobile electronic device 102 receives handwritten input 114. As described above, handwritten input 114 comprises a sequence of handwritten word elements input to user interface 106 as displayed handwritten input 108, wherein each element includes a multi-character handwritten segment (though each element may also comprise a single character handwritten segment), and an immediately following segment hint, and each segment is entered by the user according to a predefined reduction pattern. In an embodiment, a reduction pattern comprises a pair of mapping rules, including a word mapping rule and a hint mapping rule. Each type of rule is described in turn as follows.

The word mapping rule dictates which characters of words in a phrase ought to be input during input of the reduced text handwritten segment (i.e., the multi-character handwritten segment). That is, the word mapping rule defines the way to map a full text word onto a reduced text segment. One such word mapping rule is described immediately above, wherein the reduced text consists of the first two letters of each word, with single-letter words padded with a space. Of course, other word mapping rules are possible in embodiments (e.g., first three letters, first four letters, etc.). For example, another word mapping rule may consist of the first and last letter of each word, where single letter words may be padded with a space. Under this word mapping rule, "mary had a little lamb" corresponds to the reduced text "my", "hd", "a", "le", and "lb." Additional example word mapping rules, along with the resulting reduced text, are:

Initial letter plus first vowel:
"the dinosaur was furious"→"te", "di", "wa", and "fu"
Initial letter plus vowel of tonic syllable plus last letter:
"slow speaking can help"→"sow", "seg", "can", and "hep"
Initial 2 letters plus last letter:
"important papers should not get lost"→"imt", "pas", "shd", "not", "get", and "lot"

In addition to a choice of letters, the word mapping rules of other embodiments may allow for ambiguity in text entry to account for uncertain spelling. Uncertain spelling may occur where the user either does not know how to spell a word and guesses certain portions, or they make a common misspelling. For example, vowels "i" and "y" and "e" may be phonetically ambiguous. Applying this concept and the last word mapping rule shown above (i.e. first 2 letters+last letter) to the phrase "the eclipse yields glee" could result in the reduced text "the", "yce", "yes", and "gli."

In embodiments, the user may select a preferred word mapping rule to be recognized by, for example, mobile electronic device 102. Translation to full text from handwritten reduced text by mobile electronic device 102 may be made easier if both the user and device 102 know which word mapping rule is being used at any given time. This is because the word mapping rule dictates how embodiments parse the handwritten reduced text received at step 202. Parsing of the handwritten reduced text is the first step in disambiguating the handwritten reduced text, and determining the likely full text phrase or phrases that may correspond to the handwritten reduced text. However, in an embodiment, mobile electronic device 102 may be configured to determine a particular word mapping rule that a user applied to handwritten input 114 by analyzing handwritten input 114 according to the embodiments described herein, and sequencing through a list of various acceptable word mapping rules. Other embodiments may flexibly permit the user to include more or fewer characters per individual word than the selected reduction pattern may specify. Such embodiments permit the user to leverage their intuition/knowledge about how different types of input are ultimately interpreted to enhance the ability of, for example, text phrase predictor 112 to correctly resolve the reduced text to the intended text. Moreover, a user may be inclined to take shortcuts in making handwritten input where they believe based on experience that correct output will nevertheless result. In such embodiments, a delimiter character, such as a space, may be used to indicate word boundaries. Similarly, other embodiments may permit the user to omit capitalization and punctuation in the handwritten input, allowing the user to rely on the system to nevertheless produce correct output.

As described above, handwritten input 114 includes segment hints entered by the user according to a predefined reduction pattern that includes a hint mapping rule. In embodiments, a segment hint may be handwritten input or may instead comprise some other type of input made contemporaneously with the handwritten reduced text of handwritten input 114 corresponding to each word. Such hints are provided such that a hint corresponds to each entered reduced handwritten word. For example, for the reduced handwritten entry of "te", "di", "wa", and "fu", hints may be included as follows:

te (hint1) di (hint2) wa (hint3) fu (hint4) where
each two-letter pair shown above is handwritten, and
each hint is indicated above by the word "hint" (with sequence number in parenthesis), and immediately follows the handwritten two-letter pair to which it corresponds.

In an embodiment, a hint mapping rule maps the segment hint (whether handwritten or otherwise) onto a particular meaning intended by the hint (e.g. word length, word complexity, and the like). In an embodiment, the intended meaning may be configured by the user when selecting the word mapping rule to be used. For example, the user may select a reduction pattern of initial letter plus first vowel, and select a hint intended to convey word length. Alternatively, the word mapping rule may be automatically selected by text phrase predictor 112, may be set by a system administrator, or may selected in another manner.

Figure 3:
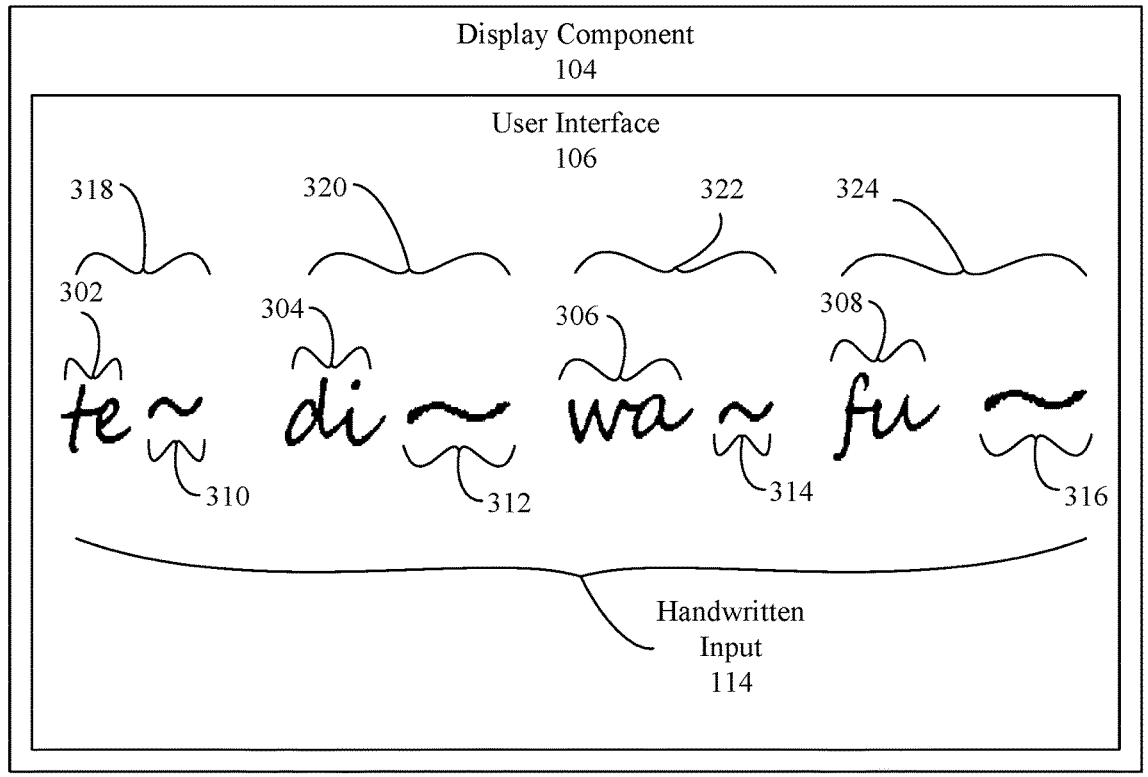
FIG. 3 shows a display component showing example abbreviated handwritten input and corresponding hints on a display screen, according to an example embodiment.

FIG. 3 depicts a display component 104 showing example abbreviated handwritten input and corresponding hints, according to this example. In particular, FIG. 3 depicts the sequence of handwritten word elements corresponding to the full text phrase "the dinosaur was furious". Recall that that under this example word mapping rule, the full text phrase "the dinosaur was furious" corresponds to the reduced text "te", "di", "wa", and "fu". In embodiments, each handwritten word element of the sequence includes a multi-character handwritten segment, and an immediately following segment hint. In FIG. 3, multi-character handwritten segment 302 and segment hint 310 comprise the handwritten word element corresponding to the word "the" in the example phrase "the dinosaur was furious." Likewise, multi-character handwritten segments 306-308 and corresponding segment hints 312-316, comprise the handwritten segments corresponding to "dinosaur", "was", and "furious", respectively.

In this example, the segment hints 310-316 are intended to convey information about the relative length of the word corresponding to each multi-character handwritten segment 302-308. For example, compare segment hint 310 and segment hint 312 of FIG. 3. As described above, the relative length of each handwritten segment hint may serve as a proxy for the relative length of the corresponding multi-character handwritten segment. Thus, segment hint 310 is relatively shorter in length relative to segment hint 312 because the word "the" is shorter than the word "dinosaur," which is relatively longer. Similarly, the length of segment hints 314 and 316 each reflect the relative length of corresponding multi-character handwritten segments 306 and 308, respectively, with each corresponding to the words "was" and "furious".

Continuing at step 204 of flowchart 200, handwritten input is parsed according to a predefined reduction pattern to determine a sequence of handwritten word elements, each handwritten word element of the sequence including, according to the predefined reduction pattern, a multi-character handwritten segment and an immediately following segment hint, and each handwritten word element corresponding to an intended word. For example, as shown in FIG. 1, handwriting input handler 110 may provide handwritten input 114 to text phrase predictor 112 which may perform the parsing.

The parsing operation serves to divide handwritten input 114 into a sequence of word elements, wherein each word element comprises a multi-character handwritten segment and a corresponding segment hint. Referring again to FIG. 3, one example of handwritten input 114 is depicted as a sequence of word elements 318-324. Each word element comprises a multi-character handwritten segment and an immediately following segment hint. For example, word element 318 includes multi-character handwritten segment 302 and segment hint 310. In an embodiment, and as described in greater detail below, handwritten input 114 may be parsed into a sequence of word elements by applying an on-line handwriting recognition algorithm to handwritten input 114 to determine the boundaries of each segment, and to translate the handwritten digital information (i.e. "digital ink") contained therein into text characters corresponding to each multi-character handwritten segment and a hint meaning corresponding to each segment hint. Although embodiments may be capable of unambiguously parsing handwritten input 114 into a sequence of multi-character handwritten segments where each of segment of the sequence corresponds to a particular word of the full-text phrase, it is not always possible to perfectly determine which particular full-text word corresponds to a particular multi-character handwritten segment. For example, the text element "ma" could correspond to any word that begins with the letters "ma". (e.g. mary, made, mad, man, mars, etc.). Accordingly, the sequence "ma ha a li la" could be "Mary had a little lamb," or it could be "manacles handle a likely larcenist." Some embodiments may use multi-word phrase translation to enable better prediction of such words as compared to conventional single word auto-correct techniques.

Referring back to FIG. 2, in step 206, sets of word probabilities corresponding to the sequence are determined by determining for each handwritten word element of the sequence a corresponding set of word probabilities based at least in part on the multi-character handwritten segment and the immediately following segment hint of the handwritten word element, each word probability of a set of word probabilities being a probability that the corresponding handwritten word element is a reduced representation of the intended word. For example, text phrase predictor 112 of FIG. 1 may be configured to determine sets of word probabilities corresponding to the sequence of word elements determined in step 204. Text phrase predictor 112 may be configured to attempt to resolve any ambiguity in word determination by determining the probability that the multi-character handwritten segment of a given word element corresponds to one or more words in step 206 and, as described in further detail below, the probability that the sequence of multi-character handwritten segments corresponds to a particular full text phrase.

For example, for each multi-character handwritten segment of the sequence of word elements generated at step 204, text phrase predictor 112 may be configured to generate a set of word probabilities that the multi-character text segment in question corresponds to a set of respective words. For example, based on the example above, the reduced text for "mary had a little lamb" is parsed into the text elements: "ma", "ha", "a", "li" and "la". Working with this example, text phrase predictor 112 may generate a set of probabilities that the multi-character text segment "ma" corresponds to a particular word. In an example embodiment, the set may consist of a predetermined number of tuples, each tuple having the form (word, word_probability), where word is the full-text word, and word_probability is the probability that the given multi-character text segment corresponds to that word. Supposing that each set contains the five most likely words, in an embodiment the set corresponding to multi-character text segment "ma" could be: [("many", p1), ("make", p2), ("may", p3), ("made", p4), ("man", p5)], where p1-p5 are the probabilities corresponding to each word.

To determine the word_probability for each tuple in the set, text phrase predictor 112 may use word lists and word-based language models that provide the probability of encountering words, and using methods known in the art, such as table lookup, hash maps, tries, and the like, to find exact or fuzzy matches for the given multi-character text segment. In some embodiments, language models and algorithms work with words or parts of words, and can encode the likelihood of seeing another word or part of word after another based on specific words, word classes (such as "sports"), parts-of-speech (such as "noun"), or more complex sequences of such parts, such as in grammar models or neural network models, such as Recurring Neural Networks or Convolutional Neural Networks. Likewise, the segment hint corresponding to each multi-character text segment provides valuable information for determining the word_probability for that multi-character text segment.

In particular, where the segment hint conveys the relative length of its corresponding word, techniques may be applied that effectively eliminate many words as candidates. For example, where a particular segment hint signifies that the corresponding word is a relatively "short" word, or a relatively "long" word, word lists and word-based language models may easily take that fact into account. Word lists, for example, are easily sorted by word length, and words exceeding a predetermined length may be culled from results. The same concept applies equally to, for example, table lookup and hash maps. Note, in this context a word may be considered relatively "short" where it contains fewer than a predetermined number of characters, where the predetermined number may be configured depending on context. For example, for simple writing such as text messages or the like, where the message content is often simple and brief, relatively "short" words may comprise words having 3 characters or fewer. In another context, however, where the writing is more complex such as detailed correspondence, relatively "short" words could comprise words having 4 or perhaps 5 characters or fewer. Likewise, a relatively "long" word" may have greater than 5 characters (or other predetermined amount defining a relatively long word). Limits may be defined in text phrase predictor for defining relatively "short" words, "relatively" long words," and for further relative word lengths (e.g., relatively "medium" length words, etc.). Note that other types of hints, as described above, may likewise be useful in generating the word probability for a given multi-character handwritten segment such as, for example, the commonness of a word.

In an embodiment, and continuing with the foregoing example, text phrase predictor 112 continues by computing additional sets of probabilities for the remaining multi-character text segments. In the current example, the multi-character text segments "ha", "a", "li" and "la". Text phrase predictor 112 generates sets of word probabilities (one set for each of the sequence of multi-character text segments generated at step 204), wherein each set comprises the probabilities that certain words correspond to each multi-character text segment. Ultimately, text phrase predictor 112 generates a full-text phrase from the handwritten input 114. Just as multi-character text segments may be mapped onto multiple possible words, different sets of words for a set of multi-character text segments may be mapped onto multiple possible phrases. Of course, not all such phrases are equally likely. Referring again the "Mary had a little lamb" example and the ambiguity between "Mary had a little lamb" and "manacles handle a likely larcenist," it can be appreciated that the latter phrase must be substantially less likely than the former owing to the fact that the words "manacles" and "larcenist" are quite rarely used in everyday writing. Furthermore, if word length hints are used in the reduced handwritten input for "Mary had a little lamb", the hints provided for "little" and "lamb" may indicate those words as relatively shorter than "manacles" and "larcenist", and thus that "manacles" and "larcenist" are less likely to be the correct words. Accordingly, text phrase predictor 112 may use the sets of word probabilities to probabilistically determine a likely phrase or phrases that may map onto handwritten input 114.

Step 206 of flowchart 200 proceeds to step 208. In step 208, based on the sets of word probabilities, a set of phrase probabilities corresponding to a plurality of phrases is determined, where each phrase probability of the set of phrase probabilities is a probability that the handwritten input is a reduced representation of a respective phrase of the phrases. In an embodiment, text phrase predictor 112 determines a set of phrase probabilities corresponding to a plurality of phrases. Each of the phrase probabilities in the set represents the probability that the reduced text of handwritten input 114 received at step 202 of flowchart 200 is a reduced text representation of the respective phrase. Similar to the sets of word probabilities described above, the set of phrase probabilities may consist of a number of tuples, each tuple having the form (phrase, phrase_probability) where phrase is the full-text phrase, and phrase_probability is the probability that the reduced text of handwritten input 114 received at step 202 corresponds to that phrase.

In embodiments, the sets of word probabilities determined by text phrase predictor 112 are used by text phrase predictor 112, in part, to determine the phrase probabilities at step 208. In particular, text phrase predictor 112 may use the word probabilities and algorithms (such as the Viterbi algorithm in one embodiment), or phrase-based language models to find likely matches for sequences of words based on the likelihood of the transition from one word to another. Such likelihood may be based on phrase lists and language models that provide the probability of encountering particular word sequences. For example, one may use n-gram knowledge that reflects the probability that "ha" words follow "ma" words. In the case where the "ma" word being considered is "Mary", text phrase predictor 112 may also consider instances of "ha" words following nouns, proper nouns and/or female proper nouns. That is, the word probabilities and/or language models may not only encode the likelihood of seeing another word based on specific adjacent words, but also take into account word classes (such as "sports"), parts-of-speech (such as "noun"), or more complex sequences of such parts, such as in grammar models or neural network models, such as Recurring Neural Networks or Convolutional Neural Networks, implemented by text phrase predictor 112.

In determining phrase probabilities at step 208, and with further reference to the "mary had a little lamb" example, text phrase predictor 112 may consider the multi-character text segment "a" in the context of surrounding word candidates. Here, "a" is unambiguously the word "a" and text phrase predictor 112 may also walk backward by considering what words of the word candidates (determined in step 206) are most likely to proceed an "a", and mostly likely to proceed each n-gram as text phrase predictor 112 walks back up the sequence of multi-character text segments.

It should be noted that the sets and tuples described in conjunction with words and phrases of steps 206 and 208, respectively, are merely exemplary, and no particular data structure or other data format or processing should be inferred. Indeed, other embodiments described herein below process words and phrases, and the probabilities associated therewith, separately. As shown in FIG. 1, text phrase predictor 112 generates one or more predicted phrases 116, which includes the set of phrase probabilities that are most probable, along with some means of associating such probabilities with particular phrases.

In the foregoing discussion of steps 204-208 of flowchart 200, it should be also be understood that at times, such steps may be performed in a different order or even contemporaneously with other steps. For example, in embodiments, receipt of handwritten input at an electronic device as shown in step 202 may occur continuously, and processing associated with parsing of such handwritten input at step 204 to generate multi-character text segments and corresponding segment hints may occur as each of the characters of the reduced text are entered. That is, some or all of steps 204-208 may occur even during execution of step 202 wherein handwritten input is being received since word and/or phrase probabilities may be assessed and updated in real-time. Likewise, determining or updating the sets of word probabilities at step 204 based on the most recently entered characters of handwritten input may occur while the set of phrase probabilities is still being determined based on prior input at step 208.

After determining a set of phrase probabilities at step 208, flowchart 200 continues at step 210. In step 210, at least one of the phrases is provided at a user interface of the electronic device. In an embodiment, as shown in FIG. 1, text phrase predictor 112 provides predicted phrase(s) 116 for display in user interface 106 of display component 104 as displayed predicted phrases 118. In an embodiment, a single phrase associated with the highest probability may be provided in predicted phrase(s) 116 for display as displayed text 108. In an embodiment, such display may be made by automatically substituting the phrase for handwritten input 114. In another embodiment, the user may be given the option to substitute the most probable phrase for handwritten input 114. Alternatively, multiple phrases (with highest probabilities) may be provided in predicted phrase(s) 116 for display as displayed predicted phrases 118, and a user may interact with user interface 106 to select one for substitution.

Figure 4:
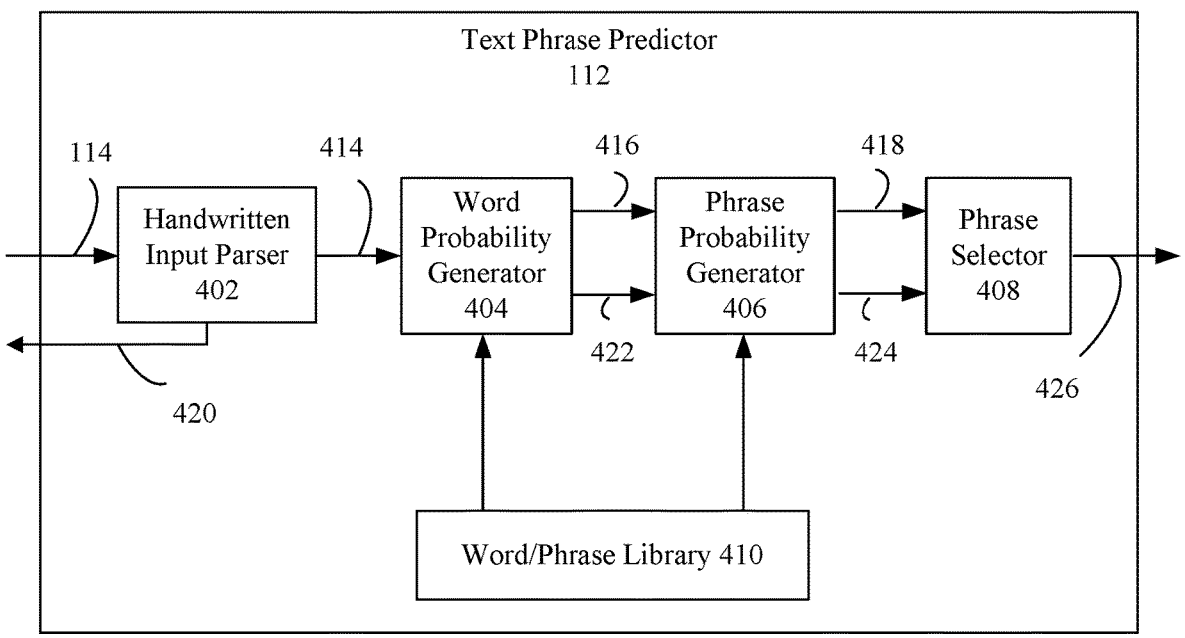
FIG. 4 shows a block diagram of an example phrase predictor, according to an example embodiment.

As noted above, each stage of flowchart 200 may be performed by text phrase predictor 112 of mobile electronic device 102, in an embodiment. Text phrase predictor 112 may be configured in various ways to perform these functions. For instance, FIG. 4 shows an example of text phrase predictor 112, according to an embodiment. Text phrase predictor 112 of FIG. 4 includes a handwritten input parser 402, a word probability generator 404, a phrase probability generator 406, a phrase selector 408, and a word/phrase library 410. Text phrase predictor 112 is configured to receive handwritten input 114, and output either an indication of parsed text elements 420 to a display component, one or more selected phrases 426 to the display component, or both. The following description of text phrase predictor 112 begins with handwritten input parser 402 accepting handwritten input 114.

Handwritten input parser 402 of text phrase predictor 112 is configured to receive handwritten input 114 (e.g., according to step 202 of FIG. 2). As described above, handwritten input 114 is an electronic representation of handwritten text entered by the user at a user interface according to a predefined reduction pattern, wherein a reduction pattern is a rule that dictates which characters of words in a phrase to be input during text entry. One example predefined reduction pattern requires the user to enter the first two letters of each word within the phrase. Again, as described above, such a reduction pattern would lead the user to enter in handwriting "mahaa lila" for "Mary had a little lamb", wherein "mahaa lila" is handwritten input 114.

Handwritten input parser 402 may be configured to parse handwritten input 114 (e.g., according to step 204 of FIG. 2), according to the predefined reduction pattern, to generate parsed text 414. In an embodiment, parsed text 414 corresponds to the sequence of parsed multi-character handwritten segments described above in relation to flowchart 200, along with the corresponding segment hints. With the example of "Mary had a little lamb" being in the form of handwritten input 114 as "mahaa lila", and the predefined reduction pattern comprises the first two letters of each word, parsed text 414 is generated as "Ma", "ha", "a", "li", "la", along with corresponding hints. Note that handwritten input parser 402 may be configured to translate the handwritten letters of handwritten input 114 (e.g., "Ma", "ha",
"a", "li", "la") to their textual values, or such translation may be performed by handwriting input handler 110 (FIG. 1). For example, handwritten input parser 402 or handwriting input handler 110 may be configured to perform handwriting recognition in any suitable manner, such as using one or more of the techniques of problem domain reduction, character extraction, character recognition, feature extraction, machine learning, convolutional networks, etc. In an embodiment, parsed text 414 is received by word probability generator 404 of FIG. 4 to determine the likelihood that each element of parsed text 414 corresponds to a particular word.

In an embodiment, word probability generator 404 is configured to determine word probabilities 416 and candidate words 422 (e.g., according to step 206 of FIG. 2), as shown in FIG. 4. In addition to accepting parsed text 414 from handwritten input parser 402, word probability generator 404 may be further configured to look up and accept word and word probability pairs based on parsed text 414 from word/phrase library 410. In an embodiment, word/phrase library 410 contains or provides n-gram probability statistics for various types of n-grams. For example, word/phrase library 410 may contain or provide probability statistics for words that start with the letters "Ma". More specifically, or phrase library 410 may be configured to provide, for example, the top 10 most common words that begin with the letters "Ma", along with the probability or frequency statistics of each.

In an embodiment, word probability generator 404 may be configured to retrieve, for example, the 10 most common words that begin with the letters of each of the elements and parsed text 414, while also taking the corresponding segment hints into account (e.g. by retrieving only words of greater than or less than a predetermined length or complexity). Referring again to the example above, after word probability generator 404 receives the 10 most common "Ma" words and their respective probabilities from word/phrase library 410, word probability generator 404 queries word, phrase library 410 for the 10 most common words in their respective probabilities for each of: "ha", "li", and "la" (Note, the "a" element of parsed text 414 is a special case, since "a" is a word that is not ambiguous, and thus need not be determined probabilistically). That is, embodiments of word probability generator 404 are configured to determine full text words that may map onto each element of parsed text 414, along with the respective probabilities that each such mapping is correct. However, it should be understood that the foregoing description of word probability generator 404 retrieving the 10 most common words/probabilities is merely exemplary. In embodiments, word probability generator 404 may be configured to retrieve or receive greater or fewer than 10 words/probabilities. In alternative embodiments, word probability generator 404 may be configured to receive or query for words and their respective probabilities only where such probabilities exceed a specified threshold.

After gathering the candidate words and their respective probabilities based on parsed text 414, word probability generator 404 is configured to provide word probabilities 416 and candidate words 422 to phrase probability generator 406. Based upon word probabilities 416 and candidate words 422, phrase probability generator 406 is configured to generate predicted phrases 424 and their respective phrase probabilities 418 (e.g., according to step 208 of FIG. 2). Phrase probability generator 406 is configured to interface with word/phrase library 410 to determine predicted phrases 424 and phrase probabilities 418, by assessing the likelihood of seeing a particular word of candidate words 422 after another word of candidate words 422. In some cases, where a word is known with certainty (e.g. "a"), phrase probability generator may determine predicted phrases 424 and phrase probabilities 418 by walking the sequence of words in reverse. That is, embodiments may assess the likelihood of seeing a particular word of candidate words 422 in a phrase before a known word of candidate words 422. As described above, this determination may be based on n-gram knowledge contained in word/phrase library 410, as well as phrase-based language models that enable finding likely matches for sequences of words based on the likelihood of transitions from one word to another. After determining predicted phrases 424 and phrase probabilities 418, phrase probability generator 406 is configured to pass the same to phrase selector 408.

Phrase selector 408 of text phrase predictor 112 is configured to select from amongst predicted phrases 424, one or more selected phrases 426 for display (e.g., according to step 208 of FIG. 2). As is described in additional detail below, phrase selector 408 may be configured to select a single phrase of predicted phrases 424 for output to a display. In an embodiment, phrase selector 408 selects a single phrase as selected phrase(s) 426 for output to a display, the phrase of selected phrase(s) 426 corresponds to the phrase of predicted phrases 424, having the highest phrase probability amongst phrase probabilities 418. In another embodiment, phrase selector 408 may be configured to select a predetermined number of phrases from amongst predicted phrases 424, and output the predetermined number of phrases as selected phrase(s) 426 for display. In an embodiment, the multiple phrases of selected phrase(s) 426 selected for output to a display are the phrases of predicted phrases 424 having the highest corresponding probabilities in phrase probabilities 418. In an alternative embodiment, the multiple phrases of selected phrase(s) 426 selected for output to a display are the phrases of predicted phrases 424 having probabilities in phrase probabilities 418 that exceed a predetermined threshold.

Although word probability generator 404, phrase probability generator 406 and work/phrase library 410 are depicted as being separate from one another, it will be apparent to persons skilled in the art that operations of each may be wholly or partly incorporated into the same component. For example, in some embodiments word probability generator 404, phrase probability generator 406 and work/phrase library 410 may be combined into the same component because the output of word probability generator 404 is provided only to phrase probability generator 406, and word/phrase library 410 services those components. Further structural embodiments will be apparent to persons skilled in the relevant art based the foregoing descriptions.

As described above, embodiments of text phrase predictor 112 may be configured to operate according to flowchart 200 as described above. In other embodiments, however, text phrase predictor 112 may be configured to generate predicted phrase(s) 116 in other ways. For example, steps 206 and 208 may be performed in a single step. In another example, step 206 may not be performed, and in step 208, the sets of phrase probabilities may be determined directly based on the handwritten input of step 202, or based on the parsed handwritten input of step 204.

For example, in an embodiment, text phrase predictor 112 may implement machine learning to convert handwritten input (parsed or not parsed) into the set of phrases with their corresponding phrase probabilities. For instance, text phrase predictor 112 may implement a suitably trained character-based language model using long short-term memory (LSTM) units in a recurrent neural network (RNN). As known in the art, such a model may be referred to as an LSTM network. The LSTM network may be trained with character sequences that comprise abbreviated input sequences (including suitably encoded hints) and their corresponding full text output character sequences. Such training results in the LSTM network learning the implied probabilities that a given input sequence corresponds to an output sequence. Such probabilities may be mapped to one or more words, which may be a phrase, or any other input sequence of handwritten characters.

In another embodiment, a pair of neural networks may be employed to perform a translation operation. The first of the two neural networks may be trained to map the reduced text and encoded hints parsed from handwritten input 114 to an n-dimensional vector that is a compact representation of the reduced text, and which captures the semantic relationships and syntactic structure of the underlying words, phrases or sentences. The second of the neural networks (e.g., suitably trained), may then be applied to map the n-dimensional vector onto the target output sequence that comprises predicted phrase(s) 116.

Text phrase predictor 112 may operate in various ways to select phrase(s) for display as selected phrase(s) 426. For example, in an embodiment, phrase selector 408 may operate according to step 210 of flowchart 200, and optionally perform additional steps. For example, embodiments may operate according to FIG. 5 or 6 after performing the method steps of flowchart 200 as shown in FIG. 2. As described above in step 210 of flowchart 200, embodiments may provide at a user interface at least one of the phrases associated with the set of phrase probabilities determined at step 208 of flowchart 200. For instance, FIG. 5 shows a flowchart 500 providing a step 502 for selecting the phrase to be displayed. In particular, in step 502, a phrase of the plurality of phrases having a highest probability among the set of phrase probabilities is provided on the display component. In an embodiment, phrase selector 408 is configured to select a phrase of the plurality of phrases determined to have highest probability of the set of phrase probabilities for display in user interface 106.

There may not, however, always be sufficiently different probabilities associated with the most likely of the plurality of phrases for the highest probability to be meaningfully different. Or, it may be desired to display multiple phrases for the user to select from. For instance, FIG. 6 shows a flowchart 600 that includes a step 602 providing an alternative embodiment for such situations. In particular, in step 602, a predetermined number of the plurality of phrases corresponding to the phrases having the highest probabilities among the set of phrase probabilities is provided at a user interface of the electronic device. In an embodiment, phrase selector 408 is configured to select a plurality of phrases determined to have highest probability of the set of phrase probabilities for display in user interface 106. In an embodiment, for example, a predetermined number of phrases with highest probabilities may be selected, or the number selected may be based on a probability threshold (i.e., only those phrases with phrase probabilities exceeding a certain threshold are selected). In another embodiment, the predetermined number may be dictated by the number of probabilistically suitable alternatives among the plurality of phrases. That is, rather than establishing the predetermined number based on an arbitrary threshold, the number may be established by evaluating the probability differences amongst the plurality of phrases. For example, suppose the plurality of phrases comprise four phrases, and their respective probability scores are 0.9, 0.85, 0.1 and 0.05. In this example, some embodiments may determine that the first two phrases ought to be displayed because the probabilities (0.9 and 0.85) reveal these phrases as far more likely alternatives compared to the last two phrases (0.1 and 0.05). For example, a threshold value (e.g., 0.5) for probability values may be selected to set a dividing line between phrases that are presented and phrases that are not. In still another embodiment, the predetermined number may be dictated by other criteria such as available screen area on the display component of the electronic device (e.g., a fixed number such as 3 may be selected because only 3 display lines are available).

Figures 7, 8:
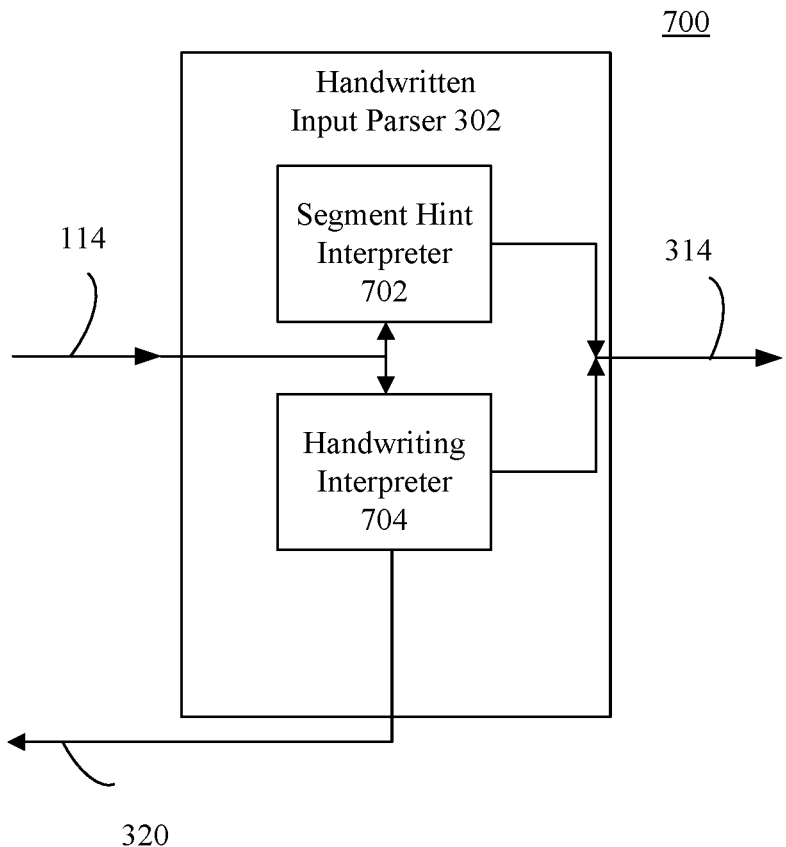
FIG. 7 shows a block diagram of an example handwritten input parser, according to an example embodiment.
FIG. 8 shows a flowchart of a method for mapping portions of abbreviated handwritten input to multi-character segments and corresponding segment hints, according to an example embodiment.

Referring again to FIG. 4, additional description of handwritten input parser 402 is now provided. As noted above, step 204 of flowchart 200 may be performed by text phrase predictor 112 of FIG. 1 and more specifically, by handwritten input parser 402 as shown in FIG. 4. Handwritten input parser 402 may operate in various ways to parse handwritten input 114 into multi-character handwritten segments and corresponding segment hints. For instance, FIG. 7 shows a block diagram of an example handwritten input parser, according to an example embodiment. Handwritten input parser 402 of FIG. 7 includes a segment hint interpreter 702 and a handwriting interpreter 704. Interpreters 702 and 704 are each configured to accept handwritten input 114 and to collectively output parsed text 414. The following description of the operation of handwritten input parser 402 is made with reference to FIG. 8. FIG. 8 shows a flowchart of a method for mapping portions of abbreviated handwritten input to multi-character segments and corresponding segment hints, according to an example embodiment. The following description of handwritten input parser 402 begins with interpreters 702 and 704 accepting handwritten input 114 for parsing.

As described above, parsing handwritten input 114 proceeds according to a predefined reduction pattern. In an embodiment, a reduction pattern comprises a pair of mapping rules, a word mapping rule, and a hint mapping rule. The word mapping rule determines which letters of words in a phrase are input during input of handwritten input 114. In an embodiment, and with reference to FIG. 8, handwriting interpreter 704 may be configured to perform step 802 of flowchart 800 by mapping a handwritten first portion of handwritten input 114 to the multi-character handwritten element. Likewise, segment hint interpreter 702 may be configured to perform step 804 of flowchart 800 by mapping a second portion of handwritten input 114 to a segment hint.

In an embodiment, interpreters 702 and 704 each receive handwritten input 114 and apply an on-line handwriting recognition algorithm to parse handwritten input 114 into a sequence of word elements. In particular, handwriting interpreter 704 may be configured to parse handwritten input 114 into multi-character handwritten segments based at least in part on the word mapping rule. Likewise, segment hint interpreter 702 is configured to parse handwritten input 114 into the segment hints corresponding to each multi-character handwritten segment generated by handwriting interpreter 704. As known in the art, an on-line handwriting recognition algorithm may be applied to handwritten input 114 to determine the boundaries of each segment, and to translate the handwritten digital information (i.e. "digital ink") contained therein into text characters corresponding to each multi-character handwritten segment and a hint meaning corresponding to each segment hint.

For example, and again referring again to FIG. 3, to parse handwritten input 114 into a sequence of word elements, boundaries between each handwritten portion may be determined to partition handwritten input 114 into segments 302-316. In one embodiment, partitioning in this fashion is sometimes referred to as "feature extraction" as is known in the art.

Handwriting interpreter 704 continues with parsing by translating the digital ink content of each multi-character handwritten segment 302-308 to its corresponding text (i.e., recognizing that multi-character handwritten segment 302 contains the letters "te"). Likewise, segment hint interpreter parses handwritten input 114 by translating the digital ink content of each segment hint into its corresponding meaning (e.g., recognizing that segment hint 310 is a relatively "short" squiggle, and flagging the word corresponding to multi-character handwritten segment 302 as a relatively "short" word). In an embodiment, this type of translation as performed by interpreters 702 and 704 is sometimes referred to as "feature classification" as known in the art.

In embodiments, the parsing performed by each of interpreters 702 and 704 may also use knowledge of the applicable reduction pattern to assist with feature extraction and classification. That is, the word mapping rule of the applicable reduction pattern may be used by handwriting interpreter 704 to assist with parsing. For instance, referring again to the word mapping rule comprising the initial letter and first vowel of each word, and as shown in FIG. 3, the phrase "the dinosaur was furious" maps to the two-character handwritten segments "te", "di", "wa" and "fu", respectively. That is, for this particular reduction pattern, the multi-character handwritten segments will always comprise two characters (except in the case of single letter words) and, for example, handwriting interpreter 704 may exploit this fact to more efficiently and accurately perform feature extraction on handwritten input 114.

Likewise, segment hint interpreter 702 may use the applicable hint mapping rule to determine the meaning to attach to a given segment onto a particular meaning intended by the hint (e.g. word length, word complexity, and the like). In an embodiment, segment hint interpreter 702 may also include a machine learning model trained to detect particular types of handwritten input (i.e. squiggles or line segments) in order to properly discern the segment hint as opposed to, for example, the regular cursive end of a word. Moreover, segment hints may serve as word delimiters and provide a powerful means to divide handwritten input 114 into a sequence of word elements. In particular, segment hints are typically more rudimentary than letters and may at times be more easily extracted by segment hint interpreter 702 thereby permitting the remainder of handwritten input 114 to be treated as exclusively multi-character handwritten segments. To take advantage of this fact, embodiments of interpreters 702 and 704 may be configured to interoperate and communicate intermediate results between one another (e.g., segment hint interpreter 702 may be configured to communicate any segment hint feature extraction results to handwriting interpreter 704).

As described above, not all steps of flowchart 200 (FIG. 2) need be performed in all embodiments. For instance, although flowchart 200 is described with respect to predicting multi-word text (e.g., phrase, sentence, paragraph, etc.) from reduced handwritten input, in other embodiments, an individual word may input by a user to a user interface and predicted. In such an embodiment, steps 202, 204, and 206 of flowchart 200 may be performed with respect to received handwritten input including a single handwritten word element that includes a multi-character handwritten segment and immediately following hint. A set of word probabilities corresponding to a set of words may be determined for the handwritten word element. One or more of the words of the set of words may be displayed in the user interface (in a modified form of step 210) as predicted words for the single handwritten word element.

III. Example Computer System Implementation

Mobile electronic device 102, text input module 110, text phrase predictor 112, handwritten input parser 302, word probability generator 304, phrase probability generator 306, phrase selector 308, and flowcharts 200, 500, 600 and 800 may be implemented in hardware, or hardware combined with software and/or firmware. For example, text input module 110, text phrase predictor 112, handwritten input parser 302, word probability generator 304, phrase probability generator 306, phrase selector 308, and/or flowcharts 200, 500, 600 and/or 800 may be implemented as computer program code/instructions configured to be executed in one or more processors and stored in a computer readable storage medium. Alternatively, text input module 110, text phrase predictor 112, handwritten input parser 302, word probability generator 304, phrase probability generator 306, phrase selector 308, and/or flowcharts 200, 500, 600 and/or 800 may be implemented as hardware logic/electrical circuitry.

For instance, in an embodiment, one or more, in any combination, of text processing module 112, handwritten input parser 302, word probability generator 304, phrase probability generator 306, phrase selector 308, and/or flowcharts 200, 500, 600 and/or 800 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
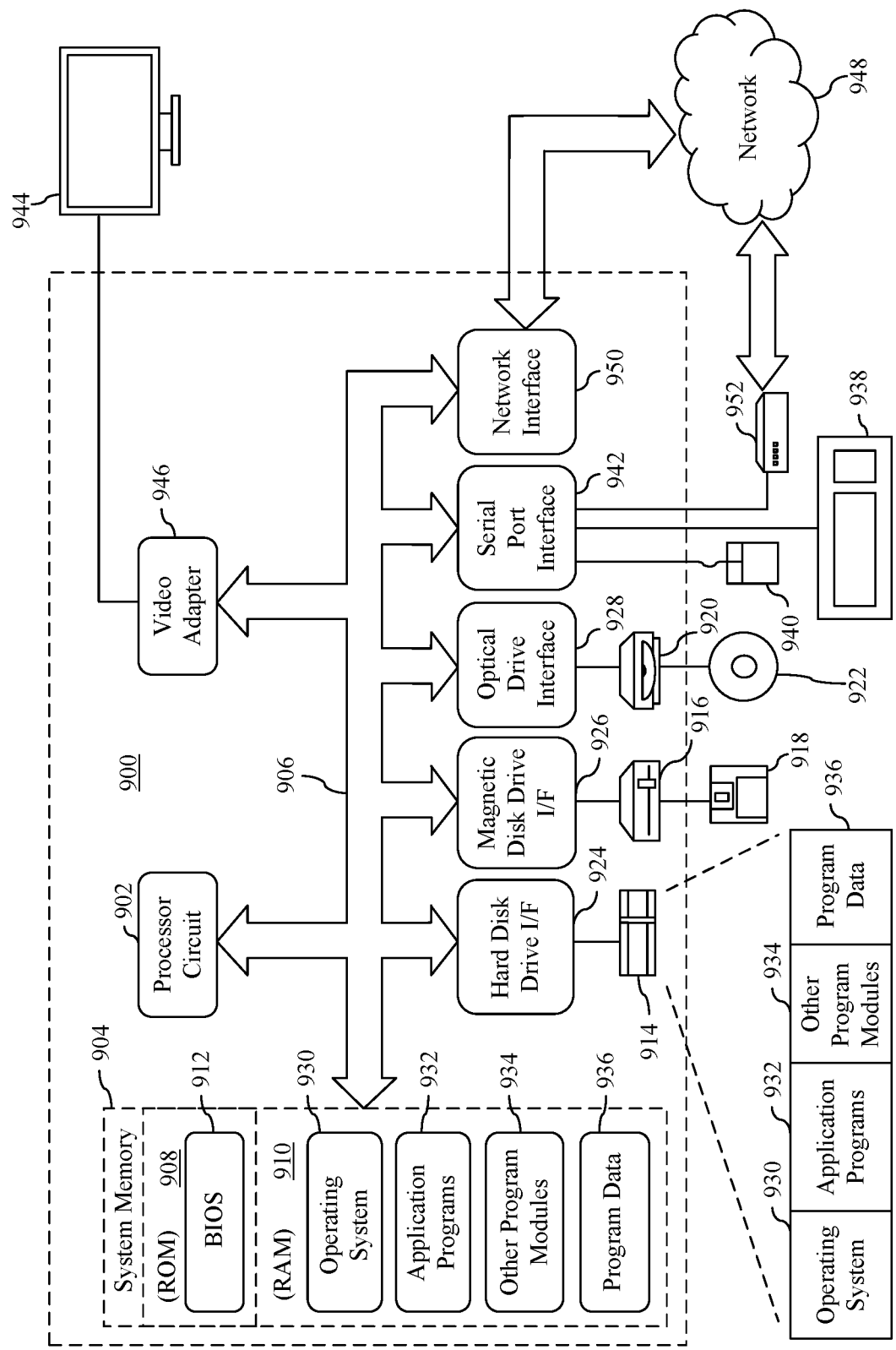
FIG. 9 is a block diagram of an example processor-based computer system that may be used to implement various embodiments.

FIG. 9 depicts an exemplary implementation of a computing device 900 in which embodiments may be implemented. For example, mobile electronic device 102 may be implemented in one or more computing devices similar to computing device 800 in stationary or mobile computer embodiments, including one or more features of computing device 800 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing text processing module 112, handwritten input parser 302, word probability generator 304, phrase probability generator 306, phrase selector 308, and/or flowcharts 200, 500, 600 and/or 800 (including any suitable step of flowcharts 200, 500, 600 and/or 800), and/or further embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments described herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A computer-implemented method of producing a text phrase from reduced input text entry is described herein. The method includes: receiving handwritten input at an electronic device; parsing the handwritten input according to a predefined reduction pattern to determine a sequence of handwritten word elements, each handwritten word element of the sequence including, according to the predefined reduction pattern, a multi-character handwritten segment and an immediately following segment hint, and each handwritten word element corresponding to an intended word; determining sets of word probabilities corresponding to the sequence by determining for each handwritten word element of the sequence a corresponding set of word probabilities based at least in part on the multi-character handwritten segment and the immediately following segment hint of the handwritten word element, each word probability of a set of word probabilities being a probability that the corresponding handwritten word element is a reduced representation of the intended word; determining, based on the sets of word probabilities, a set of phrase probabilities corresponding to a plurality of phrases, each phrase probability of the set of phrase probabilities being a probability that the handwritten input is a reduced representation of a respective phrase of the phrases; and providing at a user interface of the electronic device at least one of the phrases.

In one embodiment of the foregoing method, the predefined reduction pattern defines each multi-character handwritten segment to include at least one of a predetermined number of initial letters of a corresponding word or a predetermined number of final letters of the corresponding word.

In one embodiment of the foregoing method, the predefined reduction pattern further defines each multi-character handwritten segment to include a first vowel of the corresponding word or a vowel of a tonic syllable of the corresponding word.

In an embodiment of the foregoing method, the segment hint comprises a touch screen input of a stroke having a stroke direction and a stroke length.

In an embodiment of the foregoing method, a stroke length value less than a first pre-determined length corresponds to a relatively short length of the intended word, and a stroke length value greater than a second pre-determined length corresponds to a relatively long word length of the intended word.

In an embodiment of the foregoing method, the segment hint is formed of an input in a pre-determined input region of the touch screen, the pre-determined input region of the touch screen indicating a property of the corresponding intended word.

In an embodiment of the foregoing method, the property is a level of commonality of the intended word.

An embodiment of the foregoing method further comprises providing on the user interface of the electronic device a single phrase of the plurality of phrases having a highest probability among the set of phrase probabilities.

An embodiment of the foregoing method further comprises providing on the user interface of the electronic device a predetermined number of the plurality of phrases corresponding to the phrases having highest probabilities among the set of phrase probabilities.

A mobile electronic device is described herein. The mobile electronic device includes: a display screen capable of at least displaying textual characters; a handwriting input handler that receives handwritten input provided by a user to the mobile electronic device; and a phrase predictor that includes: a handwritten input parser configured to parse the handwritten input according to a predefined reduction pattern to determine a sequence of handwritten word elements, each handwritten word element of the sequence including, according to the predefined reduction pattern, a multi-character handwritten segment and an immediately following segment hint, and each handwritten word element corresponding to an intended word; a word probability generator configured to determine sets of word probabilities corresponding to the sequence by determining for each handwritten word element of the sequence a corresponding set of word probabilities based at least in part on the multi-character handwritten segment and the immediately following segment hint of the handwritten word element, each word probability of a set of word probabilities being a probability that the corresponding handwritten word element is a reduced representation of the intended word; a phrase probability generator configured to determine, based on the sets of word probabilities, a set of phrase probabilities corresponding to a plurality of phrases, each phrase probability of the set of phrase probabilities being a probability that the handwritten input is a reduced representation of a respective phrase of the phrases; and a phrase selector configured to provide on the display screen at least one of the phrases.

In one embodiment of the foregoing mobile electronic device, the predefined reduction pattern defines each multi-character handwritten segment to include at least one of a predetermined number of initial letters of a corresponding word or a predetermined number of final letters of the corresponding word.

In one embodiment of the foregoing mobile electronic device, the predefined reduction pattern further defines each multi-character handwritten segment to include a first vowel of the corresponding word or a vowel of a tonic syllable of the corresponding word.

In one embodiment of the foregoing mobile electronic device, the segment hint comprises a touch screen input of a stroke having a stroke direction and a stroke length.

In one embodiment of the foregoing mobile electronic device a stroke length value less than a first pre-determined length corresponds to a relatively short length of the intended word, and a stroke length value greater than a second pre-determined length corresponds to a relatively long word length of the intended word.

In one embodiment of the foregoing mobile electronic device, the segment hint is formed of an input in a predetermined input region of the touch screen, the pre-determined input region of the touch screen indicating a property of the corresponding intended word.

In one embodiment of the foregoing mobile electronic device, the property is a level of commonality of the intended word.

In one embodiment of the foregoing mobile electronic device, the phrase selector is configured to provide, for display by the display screen, a single phrase of the set of phrases having a highest probability among the set of phrase probabilities.

In one embodiment of the foregoing mobile electronic device, the phrase selector is configured to provide, for display by the display screen, a predetermined number of the set of phrases corresponding to the phrases having highest probabilities among the set of phrase probabilities.

A computer program product comprising a computer-readable memory device having computer program logic recorded thereon that when executed by at least one processor of a computing device causes the at least one processor to perform operations is described herein. In one embodiment of the computer program product, the operations comprise: receiving handwritten input at the computing device; parsing the handwritten input according to a predefined reduction pattern to determine a sequence of handwritten word elements, each handwritten word element of the sequence including, according to the predefined reduction pattern, a multi-character handwritten segment and an immediately following segment hint, and each handwritten word element corresponding to an intended word; determining sets of word probabilities corresponding to the sequence by determining for each handwritten word element of the sequence a corresponding set of word probabilities based at least in part on the multi-character handwritten segment and the immediately following segment hint of the handwritten word element, each word probability of a set of word probabilities being a probability that the corresponding handwritten word element is a reduced representation of the intended word; determining, based on the sets of word probabilities, a set of phrase probabilities corresponding to a plurality of phrases, each phrase probability of the set of phrase probabilities being a probability that the handwritten input is a reduced representation of a respective phrase of the phrases; and providing at a user interface of computing device at least one of the phrases.

In one embodiment of the foregoing computer program product, the predefined reduction pattern defines each multi-character handwritten segment to include at least one of a predetermined number of initial letters of a corresponding word or a predetermined number of final letters of the corresponding word.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method of producing a text phrase from abbreviated handwritten input, comprising:
   receiving handwritten input at an electronic device;
   parsing the handwritten input according to a predefined reduction pattern to determine a sequence of handwritten word elements, each handwritten word element of the sequence including, according to the predefined reduction pattern, a multi-character handwritten segment and an immediately following segment hint, and each handwritten word element corresponding to an intended word;
   determining sets of word probabilities corresponding to the sequence by determining for each handwritten word element of the sequence a corresponding set of word probabilities based at least in part on the multi-character handwritten segment and the immediately following segment hint of the handwritten word element, each word probability of a set of word probabilities being a probability that the corresponding handwritten word element is a reduced representation of the intended word;
   determining, based on the sets of word probabilities, a set of phrase probabilities corresponding to a plurality of phrases, each phrase probability of the set of phrase probabilities being a probability that the handwritten input is a reduced representation of a respective phrase of the phrases; and
   providing at a user interface of the electronic device at least one of the phrases.

2. The computer-implemented method of claim 1, wherein the predefined reduction pattern defines each multi-character handwritten segment to include at least one of a predetermined number of initial letters of a corresponding word or a predetermined number of final letters of the corresponding word.

3. The computer-implemented method of claim 2, wherein the predefined reduction pattern further defines each multi-character handwritten segment to include a first vowel of the corresponding word or a vowel of a tonic syllable of the corresponding word.

4. The computer-implemented method of claim 1, wherein the segment hint comprises a touch screen input of a stroke having a stroke direction and a stroke length.

5. The computer-implemented method of claim 4, wherein for the stroke length:
   a stroke length value less than a first pre-determined length corresponds to a relatively short length of the intended word, and a stroke length value greater than a second pre-determined length corresponds to a relatively long word length of the intended word.

6. The computer-implemented method of claim 3, wherein the segment hint is formed of an input in a pre-determined input region of the touch screen, the pre-determined input region of the touch screen indicating a property of the corresponding intended word.

7. The computer-implemented method of claim 6, wherein the property is a level of commonality of the intended word.

8. The computer-implemented method of claim 1, further comprising:
providing on the user interface of the electronic device a single phrase of the plurality of phrases having a highest probability among the set of phrase probabilities.

9. The computer-implemented method of claim 8, further comprising:
providing on the user interface of the electronic device a predetermined number of the plurality of phrases corresponding to the phrases having highest probabilities among the set of phrase probabilities.

10. A mobile electronic device, comprising:
a display screen capable of at least displaying textual characters;
a handwriting input handler that receives handwritten input provided by a user to the mobile electronic device; and
a phrase predictor that includes:
a handwritten input parser configured to parse the handwritten input according to a predefined reduction pattern to determine a sequence of handwritten word elements, each handwritten word element of the sequence including, according to the predefined reduction pattern, a multi-character handwritten segment and an immediately following segment hint, and each handwritten word element corresponding to an intended word;
a word probability generator configured to determine sets of word probabilities corresponding to the sequence by determining for each handwritten word element of the sequence a corresponding set of word probabilities based at least in part on the multi-character handwritten segment and the immediately following segment hint of the handwritten word element, each word probability of a set of word probabilities being a probability that the corresponding handwritten word element is a reduced representation of the intended word;
a phrase probability generator configured to determine, based on the sets of word probabilities, a set of phrase probabilities corresponding to a plurality of phrases, each phrase probability of the set of phrase probabilities being a probability that the handwritten input is a reduced representation of a respective phrase of the phrases; and
a phrase selector configured to provide on the display screen at least one of the phrases.

11. The mobile electronic device of claim 10, wherein the predefined reduction pattern defines each multi-character handwritten segment to include at least one of a predetermined number of initial letters of a corresponding word or a predetermined number of final letters of the corresponding word.

12. The computer-implemented method of claim 11, wherein the predefined reduction pattern further defines each multi-character handwritten segment to include a first vowel of the corresponding word or a vowel of a tonic syllable of the corresponding word.

13. The mobile electronic device of claim 10, wherein the segment hint comprises a touch screen input of a stroke having a stroke direction and a stroke length.

14. The mobile electronic device of claim 13, wherein for the stroke length:
a stroke length value less than a first pre-determined length corresponds to a relatively short length of the intended word, and
a stroke length value greater than a second pre-determined length corresponds to a relatively long word length of the intended word.

15. The mobile electronic device of claim 12, wherein the segment hint is formed of an input in a pre-determined input region of the touch screen, the pre-determined input region of the touch screen indicating a property of the corresponding intended word.

16. The mobile electronic device of claim 15, wherein the property is a level of commonality of the intended word.

17. The mobile electronic device of claim 10 wherein the phrase selector is configured to provide, for display by the display screen, a single phrase of the set of phrases having a highest probability among the set of phrase probabilities.

18. The mobile electronic device of claim 17 wherein the phrase selector is configured to provide, for display by the display screen, a predetermined number of the set of phrases corresponding to the phrases having highest probabilities among the set of phrase probabilities.

19. A computer-readable memory device having computer program logic recorded thereon that when executed by at least one processor of a computing device causes the at least one processor to perform operations, the operations comprising:
receiving handwritten input at the computing device;
parsing the handwritten input according to a predefined reduction pattern to determine a sequence of handwritten word elements, each handwritten word element of the sequence including, according to the predefined reduction pattern, a multi-character handwritten segment and an immediately following segment hint, and each handwritten word element corresponding to an intended word;
determining sets of word probabilities corresponding to the sequence by determining for each handwritten word element of the sequence a corresponding set of word probabilities based at least in part on the multi-character handwritten segment and the immediately following segment hint of the handwritten word element, each word probability of a set of word probabilities being a probability that the corresponding handwritten word element is a reduced representation of the intended word;
determining, based on the sets of word probabilities, a set of phrase probabilities corresponding to a plurality of phrases, each phrase probability of the set of phrase probabilities being a probability that the handwritten input is a reduced representation of a respective phrase of the phrases; and
providing at a user interface of computing device at least one of the phrases.

20. The computer-readable memory device of claim 19, wherein the predefined reduction pattern defines each multi-character handwritten segment to include at least one of a predetermined number of initial letters of a corresponding word or a predetermined number of final letters of the corresponding word.

\* \* \* \* \*